United States Patent

Chen et al.

[15] 3,704,392

[45] Nov. 28, 1972

[54] NETWORK RECLOSING RELAY

[72] Inventors: Muchuan M. Chen, Springfield; William C. Kotheimer, Lansdowne, both of Pa.

[73] Assignee: General Electric Company

[22] Filed: Feb. 1, 1972

[21] Appl. No.: 222,526

[52] U.S. Cl. ............... 317/23, 307/87, 307/130, 317/26, 317/36 TD
[51] Int. Cl. .................................... H02h 3/26
[58] Field of Search .......... 317/26, 36 TD, 23, 31; 307/130, 87

[56] References Cited

UNITED STATES PATENTS

| | | | |
|---|---|---|---|
| 3,312,864 | 4/1967 | Schwanenflugel | 317/23 |
| 3,532,935 | 10/1970 | Waldron | 317/23 |

*Primary Examiner*—James D. Trammell
*Attorney*—J. Wesley Haubner et al.

[57] ABSTRACT

A static protective relay comprises a reclosing unit for controlling a circuit breaker which when closed couples a primary feeder or a source of supply of a three-phase power distribution system to an alternating current secondary network through a network transformer. The reclosing unit senses when a voltage corresponding to the transformer voltage minus the network voltage is within a prescribed angular displacement range with respect to the network voltage and when its magnitude with respect to the network voltage is within a prescribed magnitude range. Upon the coincidence of both conditions, a reclose signal is provided to the network protector to cause it to connect the transformer to the network.

9 Claims, 8 Drawing Figures

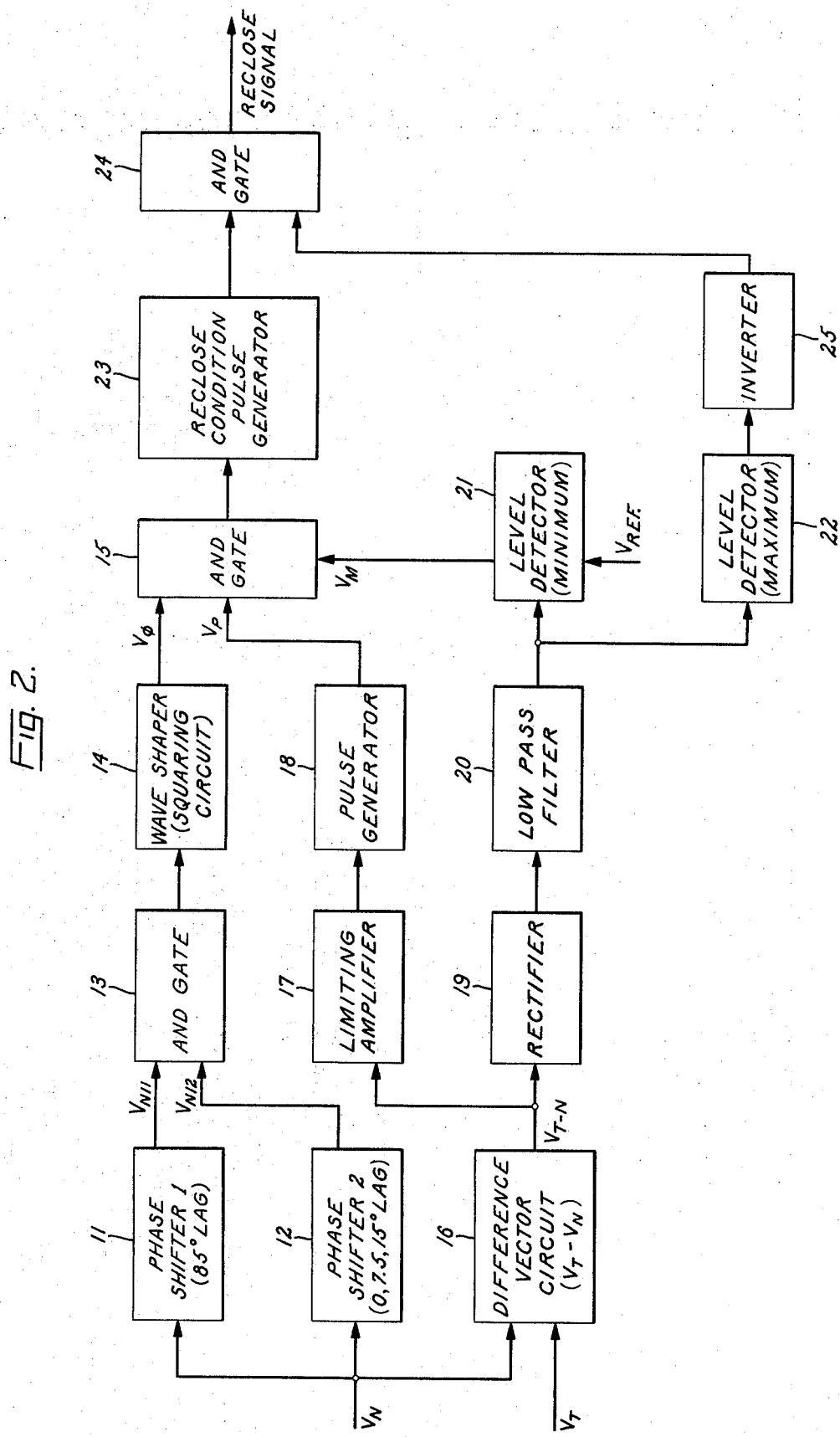

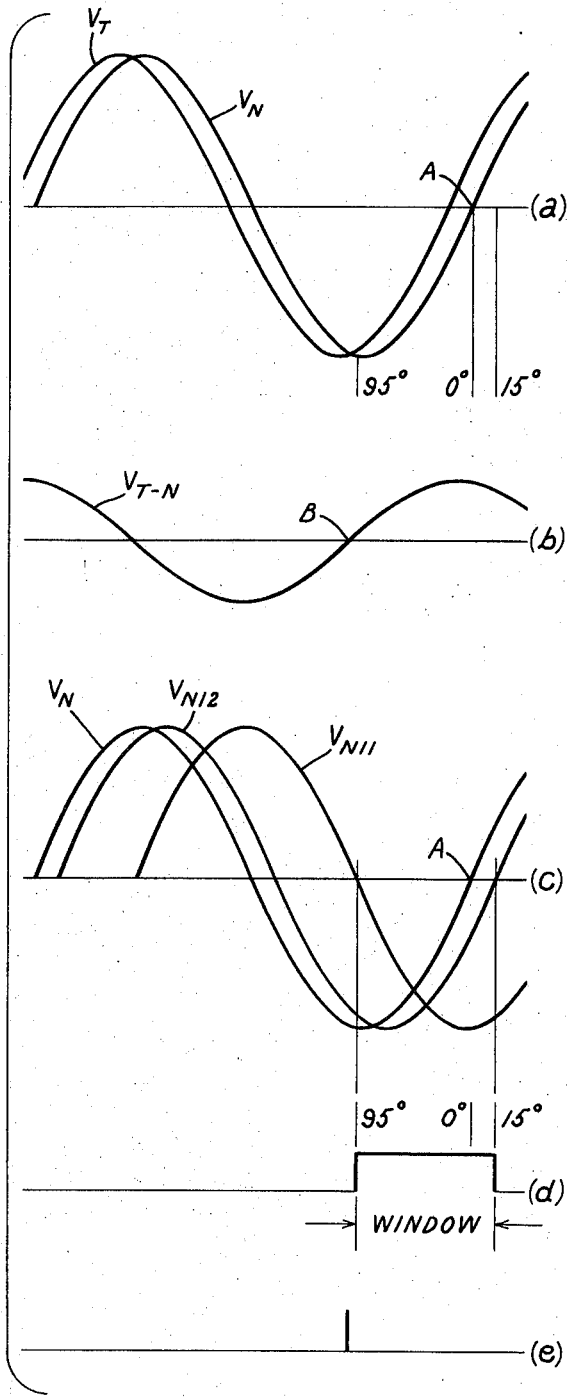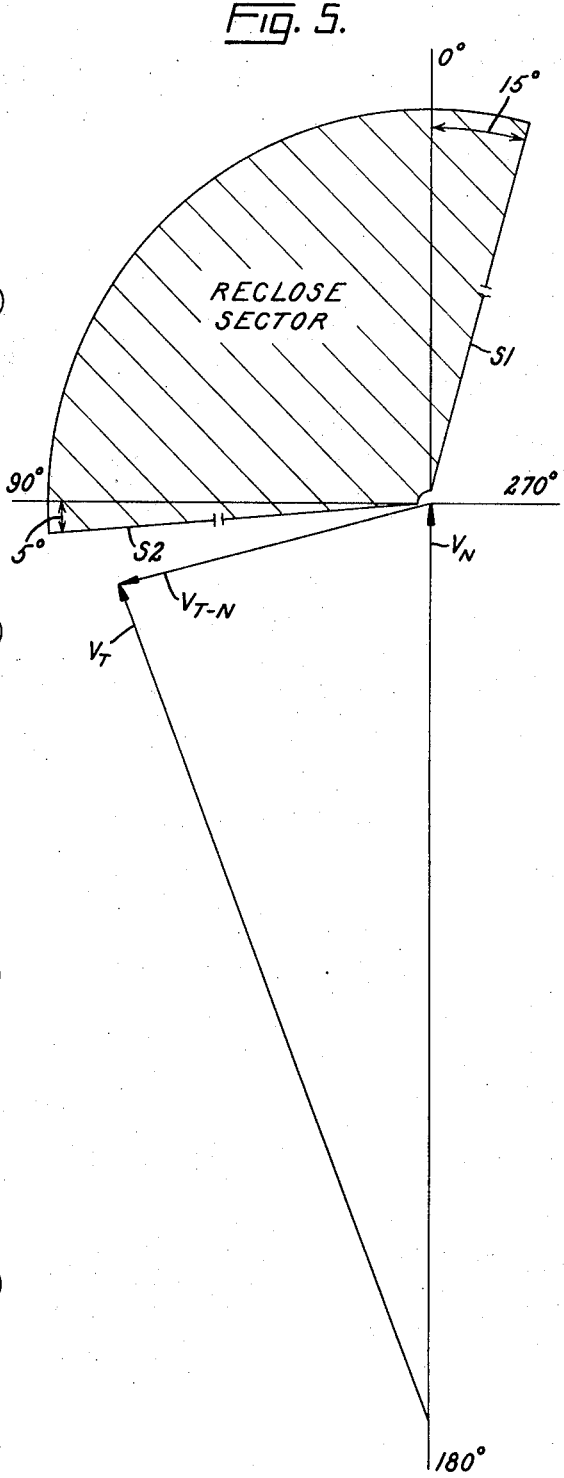
Fig. 4.
Fig. 5.

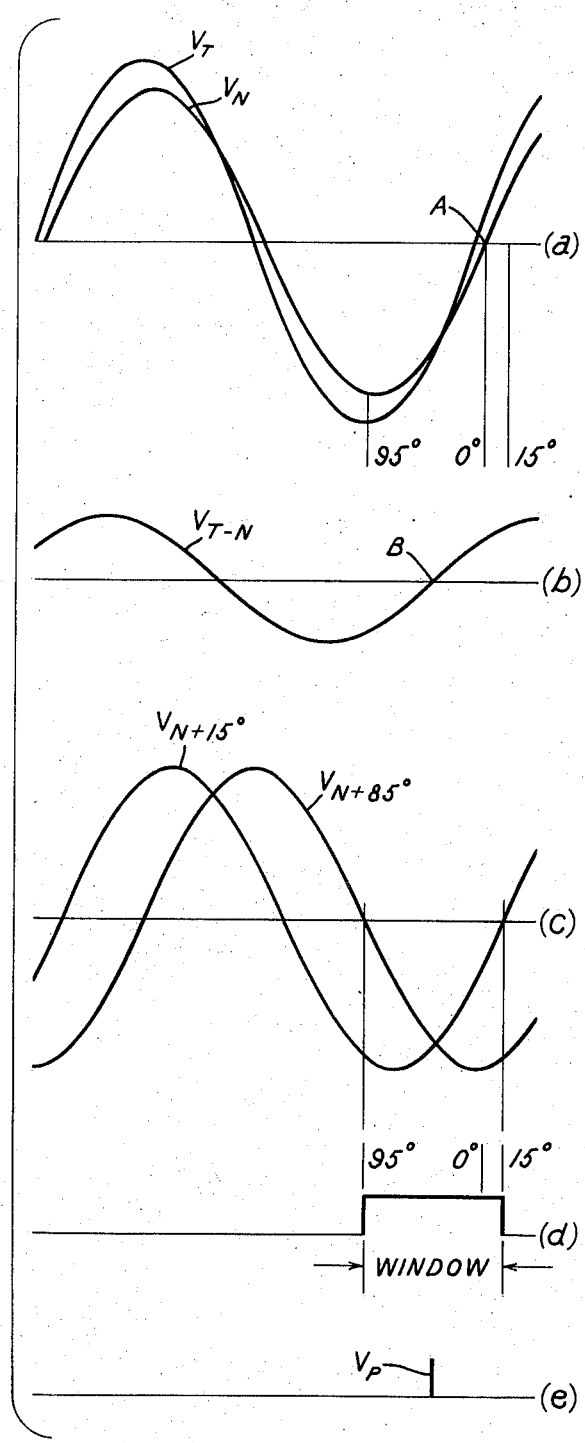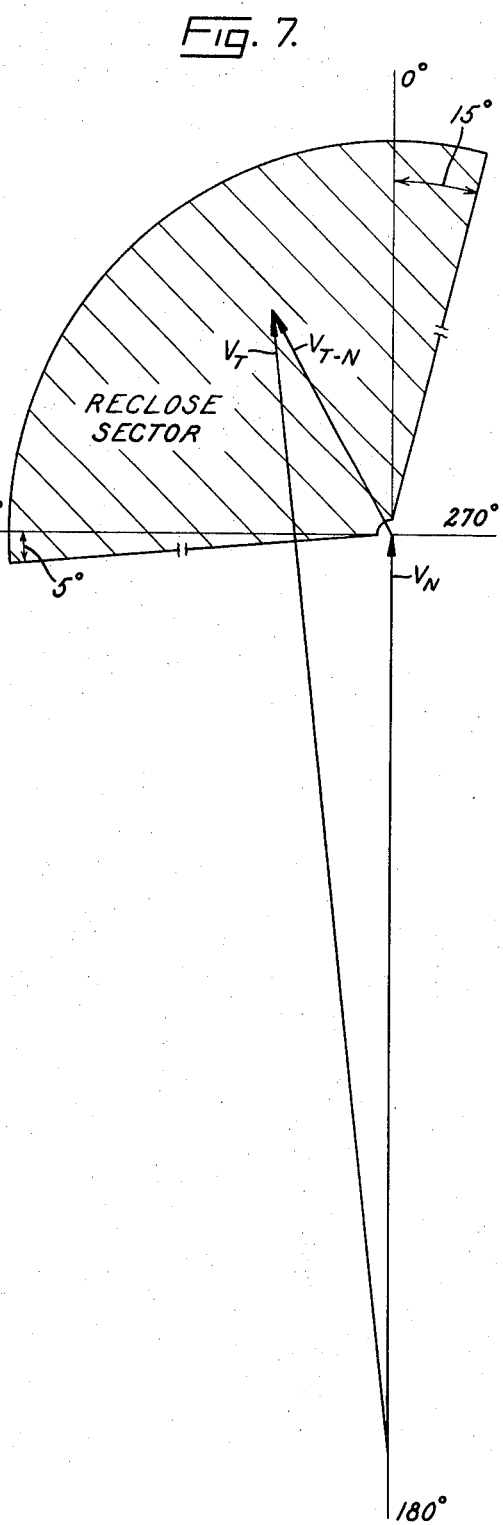

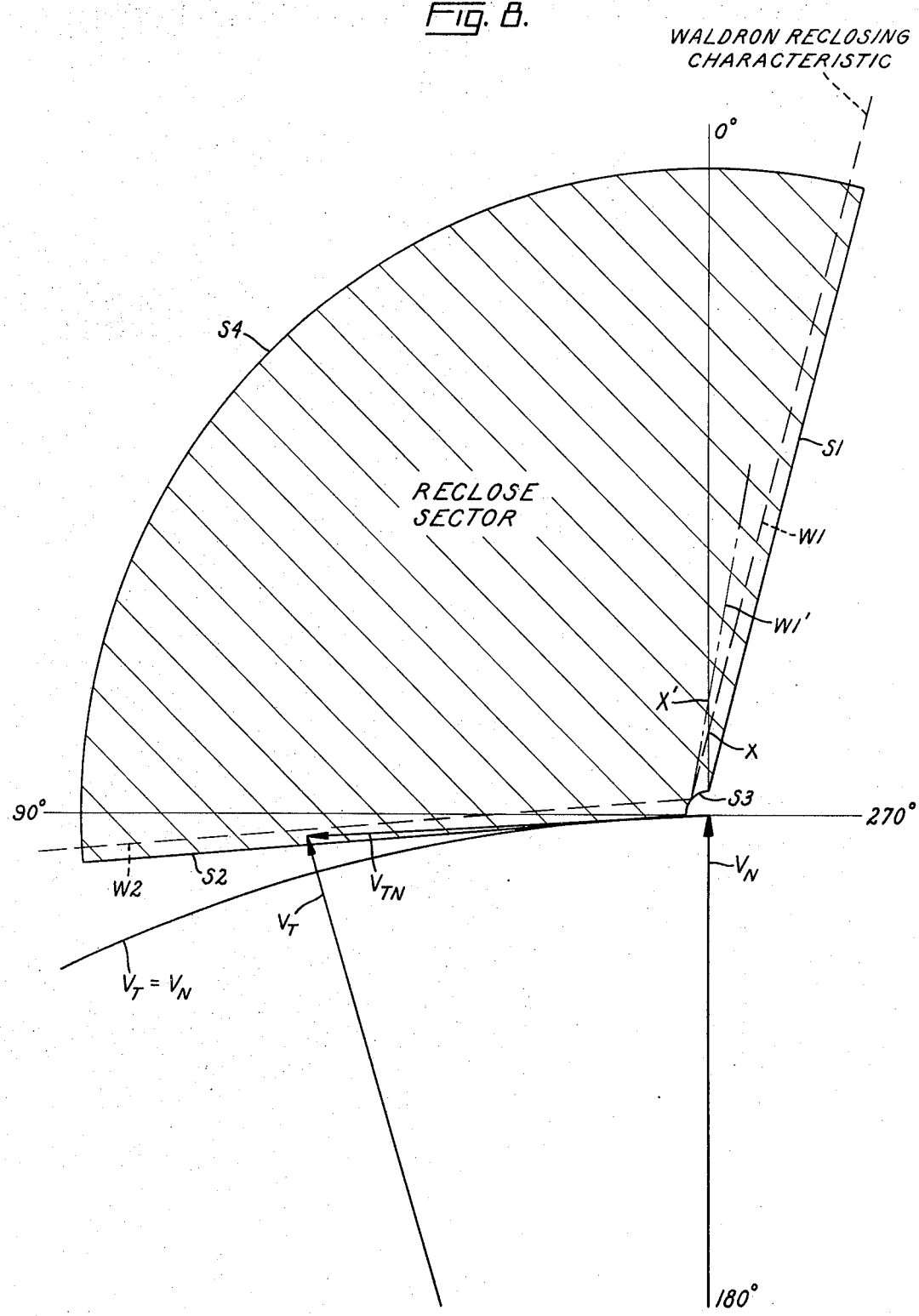

NETWORK RECLOSING RELAY

BACKGROUND AND OBJECTS OF THE INVENTION

This invention relates generally to electric power distribution systems, including alternating current secondary networks and to a network protector which connects a primary feeder to such a secondary network, and more particularly it relates to an improved reclosing unit therefor.

An alternating current secondary network comprises a grid of interconnected cables or wires which are energized at a voltage suitable for distribution to a plurality of residential, industrial and commercial loads. To insure continuity of service in a heavy load-density municipal area, the grid is supplied of electric power from primary or high voltage feeders at many points. When one source of supply or primary feeder is lost, power formerly supplied by that feeder is assumed by other, remaining feeders. Each primary feeder is connected to the network through at least one network transformer, a circuit breaker (called a protector) and a set of fuses. The network protector is provided to disconnect the network from the transformer in the event that power begins to flow out of the network. To that end the network protector has associated therewith a relay including a power directional sensing unit for controlling the opening of the network protector.

Once the network protector has been opened a reclosing unit in the relay allows the network protector to reclose only when certain conditions on both the network side of the network protector and the transformer side of the network protector are met whereby power will flow from the transformer to the network.

In U.S. Pat. No. 3,532,935—Waldron, assigned to the same assignee as our invention, there is disclosed and claimed an improved protective relay using static components for performing these tripping the reclosing functions. The disclosure of the Waldron patent can be referred to for more detailed information about prior art network systems and relays.

Waldron's relay includes, among other things, a reclosing unit for controlling the closure of a network protector. Included in his reclosing unit is a NOR circuit having as inputs: (1) an output from a circuit producing a DC voltage whenever the voltage difference across one phase of the circuit breaker is less than a certain magnitude; (2) a voltage proportional to the sum of the voltages across another phase of the circuit breaker; and (3) two voltages proportional to the voltage at one phase of the network, as phase shifted by two circuits. The NOR circuit produces an output only when no signal is present at any of the inputs. This output is coupled to a timing circuit within the reclosing unit; if the output persists for a predetermined portion of the network voltage cycle, a timing circuit energizes a reclosing coil of the network protector.

The reclosing characteristic of the reclosing unit of Waldron, when plotted on a polar graph, generally approximates an angular section lying mostly in the first quadrant with the apex of the section slightly offset from origin and within the 0° to 90° quadrant. The section is bounded by one side at an angle of up to −25° with respect to the 0° axis and by the other side at an angle of +95° with respect to the 0° axis. The angular section graphically represents the range of magnitude and angular displacements that the voltage ($V_T$) on the transformer side of the network protector may take with respect to the voltage ($V_N$) on the network side of the network protector in order to result in the transfer of power into the network, i.e., whenever the tip of the vector corresponding to $V_T$ minus $V_N$, and hereinafter referred to as $V_{T-N}$, plotted from origin, terminates within the angular section, power can flow into the network and thus reclosing is permitted.

In order to transfer real power into the network the transformer voltage must lead the network voltage. In the range wherein voltage $V_T$ leads voltage $V_N$, it is important that the magnitude of $V_T$ exceed the magnitude of $V_N$ in order that a sufficient amount of real power be transferred into the network without an undesirable flow of reactive power out of the network. In some situations, this reactive power flow may cause reopening of the trip unit of the network protector. Accordingly, in a vector plot of the reclosing characteristics the arc described by the tip of a rotating vector of magnitude $V_N$ can be considered the limit beyond which the tip of vector $V_T$ should terminate for a successful reclosing operation.

The reclosing characteristic of Waldron is relatively conservative in defining its reclosing range. Insofar as very small lead angles are concerned, this is unobjectionable. But as the angle by which $V_T$ leads $V_N$ increases, the characteristic of Waldron may not be sufficiently broad to encompass every possible voltage situation in which real power would safely flow into the network. In such a case reclosing may not occur even though sufficient real power would flow into the network to make reclosing desirable.

It is, therefore, an object of our invention to provide a static relay having a reclosing unit exhibiting a relatively broad reclosing characteristic.

The static relay of Waldron includes a timing circuit which causes the network protector to reclose in delayed response to the sustenance of a signal that is produced by the NOR circuit of his reclosing unit whenever voltage $V_T$ is greater than the voltage $V_N$ by a predetermined amount and in phase or slightly leading it. The length of the delay in reclosing is a function of the phase displacement of $V_{T-N}$. In certain cases this dependence is undesirable.

Accordingly, it is a further object of our invention to provide a static relay reclosing unit which produces a reclose signal in response to a determination that $V_{T-N}$ has been within a prescribed range for a preselected length of time, said length of time being independently adjustable.

Under certain power system conditions it is possible that voltage $V_T$ may momentarily shift slightly to lag voltage $V_N$. If this were to cause the reclosing signal to collapse and Waldron's timer to reset, reclosing would not occur until a new reclosing signal is produced and sustained for the predetermined time. To minimize the chance of such desirably delayed closure, the reclosing range as defined by Waldron includes a portion of the range wherein voltage $V_T$ lags voltage $V_N$, i.e., a portion of the reclosing characteristic lags the 0° line by up to 25°. That portion of Waldron's characteristic cuts the 0° axis at a point which defines the extent to which voltage $V_T$ must exceed voltage $V_N$ when in phase therewith for successful reclosing.

It has been found that temperature variations on the implemented circuitry can cause the slope of that portion of Waldron's characteristic to change. Since the slope of that portion is relatively small (i.e., less than or equal to 25°) a change in its slope may significantly change the value which voltage $V_T$ must attain for reclosing if $V_T$ is in phase with $V_N$. In the interest of operating reliability it is desirable to minimize the effect of temperature changes on the reclosing characteristic of the static relay in this situation.

It is therefore another object of my invention to provide a static relay with a thermally stable reclosing unit.

In order to insure that the source is not subjected to an unnecessary initial burden upon closure of the network protector, it is desirable to preclude closing in situations wherein the transfer of power into the network would be excessive.

Accordingly, it is a further object of my invention to provide a static relay with a reclosing unit which precludes reclosing if excessive power would flow into the network.

SUMMARY OF THE INVENTION

Briefly, this invention contemplates a reclosing unit for use in a static protective relay adapted for controlling a network protector (circuit breaker) connected between a primary feeder transformer and a secondary network. The reclosing unit comprises means for deriving a signal ($V_{T-N}$) corresponding to the difference between the voltage $V_N$ on the network side of the network protector and the voltage $V_T$ on the transformer side of the network protector. Means are provided for defining a range of angles which the vector representing $V_{T-N}$ may take with respect to $V_N$ in order to satisfy a first condition required for closure of the network protector and means for establishing a range of magnitudes for signal $V_{T-N}$ in order to satisfy a second closing condition. The angular range is defined by an angular section whose apex is at origin and which encompasses the entire 0°–90° quadrant and portions of the 90°–180° and 270°–0° quadrants. The magnitude range is defined by an annulus centered about origin. Means are provided to determine whether vector $V_{T-N}$ starting at origin terminates within the area common to the angular section and the annulus and to provide a reclose signal when such a condition exists.

BRIEF DESCRIPTION OF THE DRAWINGS

The subject matter of the invention is particularly pointed out and distinctly claimed in the concluding portion of the specification. For a more complete understanding of the invention together with further objects and advantages thereof, reference should be made to the following description taken in conjunction with the accompanying drawings in which:

FIG. 2 is a functional block diagram of a preferred embodiment of the reclosing unit of our invention;

FIG. 4 is a plurality of wave forms in the closing unit for the system condition wherein the voltage on the transformer side of the network protector is of the same magnitude but leading the voltage on the network side of the network protector by 20°;

FIG. 5 is a phasor representation of the condition shown in FIG. 4;

FIG. 6 is a plurality of wave forms in the reclosing unit for the system condition wherein the voltage on the transformer side of the network protector is of greater magnitude and leading the voltage on the network side of the network protector by 5°;

FIG. 7 is a phasor representation of the condition shown in FIG. 6;

FIG. 8 is a phasor diagram of the reclosing characteristic of my invention with the reclosing characteristic of Waldron superimposed thereon.

DESCRIPTION OF THE PREFERRED EMBODIMENTS

Figure 1:
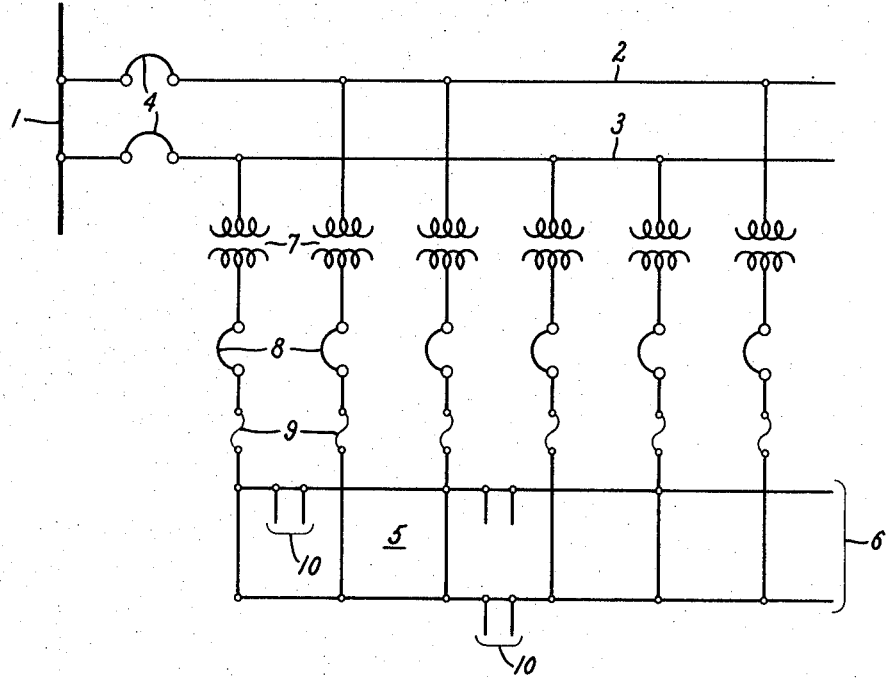
FIG. 1 is a single line schematic drawing of a typical alternating current secondary network system.

Now turning to the drawings, FIG. 1 shows an alternating current secondary network system. While this invention will be described in terms of a so-called three-phase secondary network system, it is to be clearly understood that the teachings thereof are applicable to other multiphase electric power distribution systems. Included is a primary voltage bus 1 of distribution substation and two primary feeders 2 and 3 which are connected to the bus 1 through two substation circuit breakers 4. The alternating current secondary network is generally represented by numeral 5 and comprises a plurality of interconnected cables which are connected to primary feeders 2 and 3 at a plurality of points. Each connection to the primary feeders is made by a network transformer 7 through a network protector 8, and a set of fuses 9. Connected to the secondary network cable 6 are a plurality of load feeder circuits 10.

A network protective relay is associated with each network protector to control that network and the protector in accordance with established power company practice. Such relays have numerous desired functions (e.g., the relay should open the network protector upon the occurrence of any reverse power flow above a certain magnitude to its primary feeder to disconnect only that feeder from the alternating current secondary network 5). To achieve those functions the static relay includes a unit for determining the direction of power flow through the network protector when the network protector is closed. In copending application Ser. No. 179,500 by Little, filed Sept. 10, 1971, and assigned to the same assignee as our invention, there is disclosed and claimed a novel power directional unit for effectuating certain power transfer direction criteria.

It is a common practice to include in a network relay a reclosing unit for automatically reclosing the network protector after the protector has been opened by operation of the power directional unit. In order to prevent pumping, i.e., cyclical automatic tripping and reclosing of the network protector, the reclosing unit should monitor system conditions and prevent reclosure if it determines that power would again flow out of the network upon closure of the network protector. In addition, it is desirable that the reclosing unit provide a reclosing signal for the broadest possible range of system conditions indicative of a real and reactive power flow into the network yet withhold such a signal if the magnitude of such a flow would be excessive. Furthermore, in static relays it is desirable to provide a reclosing unit defining a reclosing characteristic including a small portion of the range in which real power may flow out of the network, in order to desensitize it to spurious slight voltage changes while providing that the portion of the closing characteristic indicative of real power flow into the network remains unchanged irrespective of temperature variations.

Our static reclosing unit which is shown in functional block diagram form in FIG. 2 is designed to effectuate all of the above-noted reclosing criteria.

As can be seen, the reclosing unit comprises a phase shifter 11 and a phase shifter 12. Both of the phase shifters consist of active filters (e.g., an operational amplifier and filter) so as to provide output signals which are relatively undistorted. The phase shifters are coupled to means (not shown but like that of Waldron), providing a signal $V_N$ (which is the voltage with respect to ground of one phase of the 3-phase system on the network side of the network protector, also referred to as the network voltage), and to means (not shown but like that of Waldron) for providing a signal $V_T$ (which is the voltage with respect to ground of the same phase of the system on the transformer side of the network protector, also referred to as the transformer voltage). The output $V_{N11}$ of phase shifter 11 is combined with the output $V_{N12}$ of phase shifter 12 in an AND gate 13. The output signal of the AND gate is shaped in a wave shaping circuit 14 to provide a phase displacement range signal $V_0$ which is fed as an input into a second AND-gate 15. Also included in the reclosing unit is a means, denoted as a difference vector circuit 16, for providing a difference voltage signal $V_{T-N}$ indicative of the difference in voltage between the transformer voltage and the network voltage, i.e., $V_T - V_N$.

The signal $V_{T-N}$ is provided into a limiting amplifier 17 which amplifies the signal and provides it as an input into pulse generator 18. The pulse generator is adapted to provide a discrete energy pulse $V_P$ at a preselected point in the cycle of the wave of voltage $V_{T-N}$. The pulse $V_P$ is provided as a second input to the AND-gate 15.

Signal $V_{T-N}$ is also provided into a rectifier 19 from whence it passes into a low pass filter 20 to filter out any high frequency components of the rectified signal. The filtered, rectified signal is provided as an input of a minimum level detector circuit 21 and to a maximum level detector circuit 22. If the input to the detector 21 is above a predetermined threshold level as defined by another input, $V_{REF}$, the level detector provides a signal $V_M$ as an input to the AND-gate 15. If the input to detector 22 is above a preselected level an output signal is provided thereby.

The phase shifters 11 and 12, the AND-gate 13 and the wave shaper 14 form means for establishing a range of angular displacement which the voltage $V_{T-N}$ must take with respect to the network voltage $V_N$ in order to permit the network protector to close. This range is shown in FIG. 8 as between lines S1 and S2. Owing to the fact that the phase shifters 11 and 12 produce relatively undistorted outputs, extensions of the lines S1 and S2 will pass extremely close to origin. This is in contrast to extensions of Waldron's corresponding lines W1 and W2 which are offset from origin to a much greater degree.

As will be considered later the limits of our angular displacement range are defined by a predetermined angular displacement leading a predetermined reference point on the wave of the network voltage $V_N$ and by a predetermined angular displacement lagging that reference point.

The level detector 21 forms the means for establishing a threshold magnitude which the transformer voltage must take with respect to the network voltage in order to permit reclosing. To that end the difference voltage signal $V_{T-N}$ is rectified and filtered and supplied as an input to the level detector. If the magnitude of $V_{T-N}$ is above a threshold level a signal $V_M$ is produced. The level detector 22 forms the means for establishing the maximum which voltage $V_{T-N}$ can attain to permit reclosure.

In FIG. 8 there are clearly shown arcs S3 and S4. The radius of arc S4 represents the maximum difference between magnitudes of voltage $V_T$ and voltage $V_N$ and the radius of arc S3 represents the minimum difference therebetween to permit reclosing.

The output characteristics of the angular displacement defining means and the magnitude defining means when plotted on a polar graph establish a section (i.e., sector of an annulus) which defines the reclosing characteristic of the reclosing unit (this sector is labeled "reclose sector").

The pulse generator 18 is utilized to provide a discrete energy pulse to the AND gate in order to determine if the phase displacement of $V_{T-N}$ with respect to $V_N$ is within the prescribed angular displacement range.

Upon the coincidence of input signals $V_O$, $V_P$, and $V_M$ in the AND-gate 15 (which is indicative of the fact that the transformer voltage is above the preselected threshold level and within the predescribed phase displacement range with regard to the network voltage so as to insure that the power will flow into the network) an output signal is provided. The output signal consists of a discrete energy pulse once each cycle in the voltage $V_{T-N}$ and periodically continues as long as voltage $V_{T-N}$ is above the prescribed threshold level and within the prescribed angular range.

The output of the AND-gate 15 is provided as an input to a reclose condition pulse generator 23. This generator is operative for monitoring the presence of the train of AND gate output pulses and for providing an output signal or pulse after said pulses have continued uninterrupted for a preselected period of time. Accordingly, it should be appreciated that the presence of an output pulse from the pulse generator 23 is indicative of voltage $V_{T-N}$ remaining within the angular displacement range and above the predetermined threshold level for the preselected period of time.

Figure 3:
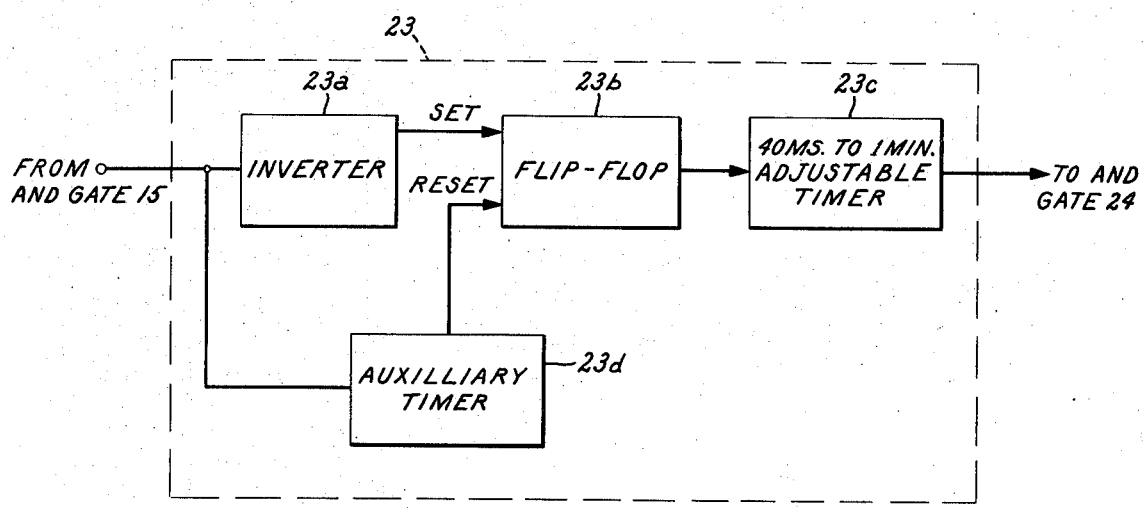
FIG. 3 is a functional block diagram showing in greater detail a portion of that shown in FIG. 2.

FIG. 3 shows the reclose condition pulse generator 23 in greater detail. As can be seen it includes an inverter 23a, a bistable multivibrator or flip-flop 23b having set and reset inputs, an adjustable timer 23c and an auxillary timer 23d.

Operation of the pulse generator is as follows: the output from the AND gate 15 is inverted by inverter 23a and supplied to the set input of flip-flop 23b. If the voltage $V_{T-N}$ is above the prescribed threshold level and within the prescribed angular range the pulses indicative thereof are supplied via the AND-gate 15 to the inverter 23a. The output of the inverter sets the flip-flop. Once set the flip-flop provides an output signal which continues until the flip-flop is reset. The flip-flop output signal is timed by timer 23c and if it persists for a preselected period of time the timer produces an output pulse. Preferably, timer 23c is manually adjustable so that the period of time before reclosure is initiated can be preselected. We have found that an adjustable timer having a range of 40 milliseconds to 1 minute will be sufficient for most purposes. If, prior to that time, the voltage $V_{T-N}$ drops below the threshold level and/or moves out of the angular range, the AND gate ceases supplying periodic pulses to the closing condition generator and the generator is disabled. To that end the auxiliary timer 23d monitors the presence of output pulses from the AND gate 15, and if no pulse appears within a preselected period of time (e.g., 20 milliseconds) it produces a reset signal and supplies it to the flip-flop's reset input. Once the flip-flop is reset the variable timer 23c is disabled, thereby precluding the production of an output pulse by the closing condition pulse generator 23.

In order to prevent reclosure if the magnitude of voltage $V_{T-N}$ is excessive we provide another AND gate, 24, one input of which being from the pulse generator 23 and the other input being from an inverter 25 connected to the output of the maximum level detector 22. If voltage $V_{T-N}$ is above a preselected maximum level, an output signal is produced by detector 22. This signal is inverted and serves to disable the AND gate. When disabled AND-gate 24 will not permit any pulse from pulse generator 23 to pass therethrough. If the magnitude of $V_{T-N}$ is below the preselected maximum level the inverted output of detector 22 does not disable the AND gate. In such an event a pulse from pulse generator 23 will pass through the gate to provide a "reclose signal" for the network protector.

Detailed operation of the reclosing unit of our invention will be better understood with reference to the wave forms of FIG. 4 and 6 phasor diagrams of FIGS. 5 and 7.

The wave forms shown in FIG. 4 and the phasor diagram shown in FIG. 5 represents a condition wherein reclosing is not permitted by our reclosing unit, whereas the wave form shown in FIG. 6 and phasor diagram shown in FIG. 7 represents a condition wherein reclosing is permitted.

The phase shifters 11 and 12 and, the AND-gate 13 and the wave shaper 14, establish the angular range in which reclosing is permitted. The range is defined in the following manner: The phase shifter 11 shifts the phase of $V_N$ by 85° lagging, to provide the voltage signal $V_{N11}$ (shown in FIG. 3c and 5c) and the phase shifter 12 shifts the phase of $V_N$ by 15° lagging to provide the voltage signal $V_{N12}$ (shown in FIGS. 3c and 5c). The voltage signals $V_{N11}$ and $V_{N12}$ are provided as inputs to the AND-gate 13. The output signal of the AND-gate 13 is fed into a wave shaping circuit 14 to produce a square wave output signal $V_O$, see FIGS. 3d and 5d, whenever both of the voltages $V_{N11}$ and $V_{N12}$ are negative.

The square wave $V_O$ commences at the angular displacement of 95° leading a reference point A on the network voltage $V_N$ and terminates at the angular displacement of 15° lagging that point. The reference point A is at the point in time at which the wave $V_N$ crosses zero going positive. In phasor form reference point A corresponds to a vector of magnitude $V_N$ and at an angle of 0°. Therefore the square wave $V_O$ establishes a range of angles between 15° lagging and 95° leading the network voltage $V_N$ when that voltage is at 0°. This range is shown graphically in the phasor diagram of FIGS. 5, 7 and 8 as existing between lines S1 and S2 and is the angular displacement range. It is also denoted as a "window" in FIG. 3d, 3e, 5d and 5e.

In order to determine if the vector representing the voltage $V_{T-N}$ lies between lines S1 and S2, i.e., within the angular displacement range, it is necessary to determine its phase displacement relative to the voltage $V_N$. This is accomplished by determining the displacement between the reference point on the voltage wave form $V_N$ and the angularly corresponding point on the wave form $V_{T-N}$ since both waves have the same period. The angularly corresponding point on wave $V_{T-N}$ is denoted as point B.

The means which we utilize to indicate when voltage $V_{T-N}$ is at point B in its cycle includes difference vector circuit 16, the limiting amplifier 17 and pulse generator 18. To that end output $V_{T-N}$ of the difference vector circuit is amplified and, if it is excessively large is limited by amplifier 17. The pulse generator takes the amplified signal from the amplifier 17 and provides a discrete energy pulse $V_P$ whenever an amplified signal, $V_{T-N}$, crosses zero going positive (i.e., point B). The pulse $V_P$ is provided as an input into the AND-gate 15. The coincidence of signals $V_P$ and $V_0$ indicates that vector $V_{T-N}$ lies within the angular reclosing range or "window."

It should be pointed out that in some cases, even though vector $V_{T-N}$ may be within the angular displacement range, reclosing may not be desirable. For example, if the magnitude of $V_{T-N}$ is very small, e.g., 1 volt or less, sufficient power may not flow into the network to warrant closure of the network protector. Conversely, if the magnitude of $V_{T-N}$ is large, e.g., 50 volts or more, excessive power may flow into the network if the network protector were closed. An excessive power flow into the network may result in an undesirable burden on the voltage system source.

Accordingly, our reclosing unit is designed so as to permit reclosure of the network protector if the transformer voltage exceeds the network voltage by at least a predetermined minimum amount but less than a predetermined maximum amount.

The minimum level which voltage $V_{T-N}$ must attain is determined by the input voltage $V_{REF}$ to the level detector 21. We have found that a minimum level of 1 volt is effective to ensure that sufficient power will flow into the network, but this minimum level is adjustable.

The maximum level which voltage $V_{T-N}$ should attain so as to ensure against overburdening the source upon closure has been found to be approximately 50 volts. Accordingly the level detector 22 is designed so as not to produce signal $V_M$ if $V_{T-N}$ is greater than 50 volts.

In operation the difference voltage signal $V_{T-N}$ is rectified by rectifier 119 and filtered by a low pass filter 20 to eliminate any high frequency components and then is fed as an input to the level detector 21 and level detector 22. If the rectified filtered $V_{T-N}$ signal is above the prescribed level the detector 21 produces signal $V_M$ and supplies it as an input to an AND-gate 15 and at the same time level detector 22 fails to produce a signal, whereby AND-gate 24 is not disabled.

In the voltage condition case shown in FIGS. 4 and 5 the transformer voltage is of the same magnitude as the network voltage and leads it by an angle of 20°. The difference voltage $V_{T-N}$ in such a situation is shown in FIG. 4b and FIG. 5.

At the point on which the wave of voltages $V_{T-N}$ crosses zero going positive, the pulse generator 18 produces a discrete pulse $V_P$. As can be seen in FIG. 4(a) pulse $V_P$ lies outside the "window" defined by voltage $V_{N11}$ and voltage $V_{N12}$ (in the phasor diagram of FIG. 5, vector $V_{T-N}$ lies outside the reclose sector defined by S1 and S2).

Accordingly, even though the magnitude of $V_{T-N}$ lies within the range defined by extensions of arcs S3 S4, reclosure will not be permitted.

In the voltage condition case shown in FIGS. 6 and 7 the transformer voltage is 25 percent larger in magnitude than the network voltage and leading it by an angle of 5°. The difference voltage $V_{T-N}$ in such a situation is shown in FIGS. 6b and 7.

At the point on which the wave of voltage $V_{T-N}$ crosses zero going positive, the pulse generator produces pulse $V_P$. As can be seen in FIG. 6e, pulse $V_P$ lies within the "window" defined by voltage $V_{N11}$ and voltage $V_{N12}$ (in the phasor diagram of FIG. 7, vector $V_{T-N}$ lies within the reclose sector defined by lines S1 and S2). Furthermore, the magnitude which $V_T$ exceeds $V_N$ by, i.e. the magnitude of voltage $V_{T-N}$, is within the range established by arcs S3 and S4.

Accordingly the AND-gate 15 provides a train of pulses (one each time the waveform $V_{T-N}$ crosses zero going positive) to the reclose control pulse generator 23. Upon the uninterrupted flow of such pulses for the predetermined time as set by the variable timer 23c, the pulse generator provides a pulse to AND-gate 24. Since AND-gate 24 is not disabled the pulse passes therethrough to become a reclose signal. The reclose signal is utilized to initiate the closure of the network protector to connect the network to the network transformer.

It should be noted that although the portion of our reclosing characteristic denoted by line S1 is shown at an angle of 15° leading the zero degrees axis, it may be coaxial therewith (same angle as the 0° axis) or at other angles thereto (e.g., 7.5°). To accomplish that end, phase shifter 12 includes circuitry to vary the amount that voltage $V_{N12}$ is shifted with respect to voltage $V_N$.

In most cases line S1 will preferably be at some angle with respect to the 0° axis to include a small portion of the area in the 0°–270° quadrant. As should be appreciated the 0°–270° quadrant represents magnitudes and phase displacements of the transformer voltage relative to network voltage indicative of power flow out of the network. We include a small portion of this range in our reclosing characteristic to ensure that closure will still occur even if the voltage $V_T$ momentarily shifts from leading $V_N$ to slightly lagging it during the interval between the commencement of a reclosing signal and the energization of the closing coil of the network protector. In other words, by including some portion of a reverse power flow range into our reclosing characteristic we prevent the variable timing circuit 23c from being disabled in the event of a spurious shift of voltage $V_T$ lagging voltage $V_N$.

It should be pointed out that Waldron's characteristic also includes a portion of the 0°–270° quadrant for similar purposes. Inasmuch as the portion of Waldron's characteristic for accomplishing that end crosses the 0° axis at a relatively small angle with respect thereto, temperature changes in his reclosing unit may effectuate significant changes in the portion of his reclosing characteristic indicative of power transfer into the network. This can best be appreciated with reference to FIG. 8 wherein we have superimposed Waldron's reclosing characteristic on our characteristic.

Waldron's characteristic is shown by dotted lines W1 and W2. As can be seen the portion of his characteristic in the 0°–270° quadrant is denoted as line W1. Line W1 intersects the 0° axis at point X which represents the minimum magnitude which voltage $V_{T-N}$ must attain for reclosure to occur if voltage $V_T$ is in phase with voltage $V_N$. If the angle which W1 intersects the 0° axis changes slightly as a result of temperature variations, the minimum magnitude which voltage $V_{T-N}$ must attain for reclosure may change significantly. The broken line in FIG. 8 is provided to graphically represent such a situation. As can be seen, for a slight change in the angle of line W1 with respect to the 0° axis, the in-phase minimum value of $V_{T-N}$ increases significantly from point X to point X'.

It should be readily apparent that since line S1 of our characteristic does not intersect the 0° axis (i.e., only arcs S3 and S4 intersect that axis) slight variations in the angle of S1 relative to the 0° axis will not affect the portion of our reclosing characteristic within the 0°–90° quadrant (i.e., the area representing power flow into the network) and the minimum magnitude which $V_{T-N}$ must attain when $V_T$ is in phase with $V_N$ will remain constant.

As can be seen in FIG. 8 our reclosing characteristic is also somewhat broader than the reclosing characteristic of Waldron. Therefore, our reclosing unit enables reclosing to occur under conditions which Waldron's unit may not allow. FIG. 8 is a phasor diagram of one such voltage condition.

As previously noted when the transformer voltage exceeds the network voltage, power will flow into the network. Accordingly, the arc $V_T = V_N$ may be considered an ideal limit for a reclosing characteristic in the 90°–180° quadrant. As can be seen in FIG. 8 our characteristic line S2 more closely approaches that arc than does the corresponding characteristic line W2 of Waldron.

In the voltage example depicted in FIG. 8, the transformer voltage $V_T$ is shown as being slightly larger in magnitude than the network voltage $V_N$ and leading in phase. Under such conditions real power will flow into the network if the network protector is closed. Yet, Waldron's unit may not permit reclosure since vector $V_{T-N}$ lies slightly outside his reclosing characteristic. In contradistinction, our unit will enable reclosure to occur since vector $V_{T-N}$ lies within our characteristic.

While we have shown and described a particular embodiment of our invention, it will be obvious to those skilled in the art that various changes and modifications may be made without departing from our invention in its broader aspects; and we, therefore, intend herein to cover all such changes and modifications as fall within the true spirit and scope of our invention.

What we claim as new and desire to secure by Letters Patent of the United States is:

1. For use in a power distribution system including an alternating current secondary network applied at a plurality of points from one or more primary feeders, each of said points being connected to a primary feeder by means of a network protector and a transformer, a static relay for supervising a closing operation of the network protector comprising:
   a. first means responsive to the AC voltage on the network side of the network protector for providing a first signal during a predetermined interval in the cycle of said AC voltage, the limits of said interval being defined by a predetermined amount of angular displacement on one side of a reference point in the AC voltage cycle and by a predetermined displacement on the other side of said reference point, said reference point being at a predetermined angular position in said AC voltage cycle;
   b. second means for deriving from the system a first AC signal proportional to the difference between the voltage on the transformer side of the network protector and the voltage on the network side of the network protector;
   c. third means for providing a second signal at a predetermined point in the cycle of the first AC signal, the angular position of said predetermined point in the cycle of the first AC signal being equivalent to said angular position of the reference point in the AC voltage cycle;
   d. fourth means for providing a third signal only when the magnitude of the first AC signal is above a predetermined threshold level; and
   e. fifth means coupled to said second, third and fourth means for providing an output signal upon the coincidence of said first, second and third signals.

2. The static relay as specified in claim 1 wherein said fourth means also provides a fourth signal when the magnitude of the first AC signal is above a predetermined threshold level and wherein said fifth means provides an output signal upon the coincidence of said first, second, third and fourth signals.

3. The static relay as specified in claim 1 wherein said first means comprises:
   i. sixth means for deriving from the system a second AC signal proportional to the voltage on the network side of the network protector but shifted in phase by a first predetermined amount therefrom;
   ii. seventh means for deriving from the system a third AC signal proportional to the voltage on the network side of the network protector but shifted in phase by a second predetermined amount therefrom; and
   iii. eighth means coupled to said sixth and seventh means for establishing said predetermined interval, said interval being a time interval during which said second and said third AC signals bear a predetermined relationship to each other.

4. The static relay specified in claim 3 wherein said interval is defined by the time interval during which both of said second and third AC signals are of a predetermined polarity and wherein said reference point is the point at which the voltage on the network side of the network protector changes from said predetermined polarity to the opposite polarity.

5. The static relay as specified in claim 4 wherein said predetermined polarity is negative and wherein the limits of said interval are approximately 95° leading the reference point and approximately 15° lagging it.

6. The static relay as specified in claim 5 wherein said eighth means comprises:
   i. an AND gate; and
   ii. a wave squaring circuit; and wherein said third means comprises a pulse generator which produces a discrete energy pulse whenever said first AC signal changes from said predetermined polarity to the opposite polarity.

7. The static relay as specified in claim 6 wherein said fourth means comprises:
   i. rectifier means coupled to said second means;
   ii. filter means connected to said rectifier means; and
   iii. a level detector having two inputs, one of said inputs being supplied from said filter means and the other of said inputs being provided with a threshold level signal.

8. For use in a power distribution system including an alternating current secondary network applied to a plurality of points from one or more primary feeders, each of said points being connected to a primary feeder by means of a network protector and a transformer, a static relay for supervising a closing operation of the network protector comprising:
   a. means for providing a first voltage corresponding to the voltage on the network side of the network protector, a second voltage corresponding to the voltage on the transformer side of the network protector and a third voltage corresponding to the difference between said second and said first voltages;
   b. means for providing a first signal only when the angular displacement of the third voltage with respect to the first voltage is within an angular range, one limit of said range slightly lagging said first voltage and the other limit thereof leading said first voltage by approximately 95°;
   c. means for providing a second signal only when the magnitude of said third voltage exceeds a predetermined threshold level;
   d. adjustable timing means for providing an output signal only when said first and second signals have coincided for a preselected period of time.

9. The static relay as specified in claim 8 additionally comprising:
   e. means for providing a third signal only when said third voltage exceeds a predetermined maximum level; and
   f. means for providing a reclose signal in response to the presence of said output signal and the absence of said third signal.

* * * * *